United States Patent [19]
Hirata et al.

[11] Patent Number: 5,289,582
[45] Date of Patent: Feb. 22, 1994

[54] COMMUNICATION CONTROL UNIT

[75] Inventors: Osamu Hirata, Tokyo; Hiroshi Nobuta, Yokohama; Takashi Kotani, Tokyo; Takuji Nakatsuma, Machida, all of Japan

[73] Assignee: Canon Kabushiki Kaisha, Tokyo, Japan

[21] Appl. No.: 965,574

[22] Filed: Oct. 23, 1992

Related U.S. Application Data

[63] Continuation of Ser. No. 759,954, Sep. 17, 1991, abandoned, which is a continuation of Ser. No. 550,223, Jul. 9, 1990, abandoned, which is a continuation of Ser. No. 137,341, Dec. 23, 1987, abandoned.

[30] Foreign Application Priority Data

Dec. 27, 1986 [JP] Japan ................. 61-312674
Jan. 30, 1987 [JP] Japan ................. 62-19920

[51] Int. Cl.⁵ ............... G06F 5/06; G06F 15/00
[52] U.S. Cl. ................... 395/275; 358/400
[58] Field of Search .......... 395/200, 275, 325, 550; 375/8; 358/400

[56] References Cited

U.S. PATENT DOCUMENTS

| | | | |
|---|---|---|---|
| 4,085,449 | 4/1978 | Walsh et al. | 364/900 |
| 4,514,824 | 4/1985 | Loskorn et al. | 364/900 |
| 4,514,825 | 4/1985 | Nordling | 364/900 |
| 4,583,124 | 4/1986 | Tsuji et al. | 358/256 |
| 4,607,345 | 8/1986 | Mehta | 364/900 |
| 4,672,460 | 6/1987 | Tsuda | 358/256 X |
| 4,680,699 | 7/1987 | Uchino | 364/200 |
| 4,754,428 | 6/1988 | Schultz et al. | 364/900 |
| 4,771,335 | 9/1988 | Obara | 358/256 X |
| 4,771,417 | 9/1988 | Maxwell et al. | 375/8 X |
| 4,785,355 | 11/1988 | Matsumoto | 358/257 |

*Primary Examiner*—Heather R. Herndom
*Attorney, Agent, or Firm*—Fitzpatrick, Cella, Harper & Scinto

[57] ABSTRACT

A communication control unit for controlling communication of data from external equipment includes a receiver for receiving the data from the external equipment, a transmitter for transmitting the data received by the receiver, a first set device for setting a data transmission rate between the receiver and the external equipment, and a second set device for setting a data transmission rate of the transmitter in accordance with the data transmission rate set by the first set device.

16 Claims, 10 Drawing Sheets

TABLE OF FAX TRANSMISSION EXTENDED LOCAL (CFU)

| FUNCTION ELEMENT | CFUI | PARAMETER FIELD ||||
|---|---|---|---|---|---|
| | | PARAMETER | FORMAT | CONDITION | VALUE OF PARAMETER |
| OPERATION MODE SET-UP | LMD | MEDIA TYPE | MOD=X | M | X = 0  JUST-PC<br>1  FAX TRANSMISSION |
| | | TEL NUMBER OF SENDER | TEL=XXX··· | O | NUMERAL STRING ('Δ', '0'~'9') 20max |
| | | USER ID | UID=XXX··· | O | CHARACTER STRING  16max |
| LOCAL RESPONSE | LRS | NOTIFY LAST PAGE SENT | PIC=X | M | X = 0  OK<br>1  NG |
| CALLED STATION IDENTIFY- CONFIRMATION | LRA | CODING TYPE | TYP=X | M | X = 0  MH<br>1  MH, MR |
| | | RECORD WIDTH | HRZ=X | M | X = 0  ≤ A4<br>1  ≤ B4<br>2  ≤ A3 |
| | | RECORD LENGTH | VER=X | M | X = 0  A4<br>1  NO LIMIT<br>2  A4, B4 |
| | | MODEM TYPE | MDM=X | M | X = 0  V.27ter fall<br>1  V.27ter<br>2  ——<br>3  V.27ter, V.29 |
| | | RESOLUTION (DENSITY) | DEN=X | M | X = 0  ONLY 3.85 ℓ/mm<br>1  7.7 ℓ/mm ALSO<br>2  7.7 ℓ/mm ALSO |
| | | TEL NUMBER OF SENDEE | TEL=XXX··· | O | NUMERAL STRING ('Δ', '0'~'9') 20max |
| | | USER ID | UID=XXX··· | O | CHARACTER STRING  16max |

FIG. 9A

| FUNCTION ELEMENT | CFUI | PARAMETER FIELD ||||
|---|---|---|---|---|---|
| | | PARAMETER | FORMAT | CONDI-TION | VALUE OF PARAMETER |
| SPEECH COMM RESERVE INSTRUCTION | LTL | SPEECH COMM RESERVE SET-UP | TRS=X | M | X=0 RESET<br>1 SET |
| DOCUMENT END NOTIFICATION | LDE | — | — | | — |
| FAX INTERRUPT INSTRUCTION | LSF | — | — | | — |
| PAGE SEND REQUEST | LPT | CODING TYPE | TYP=X | M | X=0 MH<br>=1 MR |
| | | TRANSMISSION LINE WIDTH | HRZ=X | M | X=0 A4<br>1 B4<br>2 A3 |
| | | RECORD LENGTH | VER=X | M | X=0 A4<br>1 NO LIMIT<br>2 B4 |
| | | MAXIMUM TRANSMISSION RATE | BPS=X | NM | X=0 9600 bps.<br>1 7200 bps.<br>2 4800 bps.<br>3 2400 bps. |
| | | RESOLUTION (DENSITY) | DEN=X | M | X=0 ONLY 3.85 ℓ/mm<br>1 7.7 ℓ/mm ALSO |
| | | PAGE RE-SEND FUNCTION | PRC=X | M | X=0 ABSENT<br>1 PRESENT |
| FAX TRANSMISSION END NOTIFICATION | LIE | REASON OF TERMINATION (ERROR CODE) | ERR=XXX | M | NUMERAL STRING (0~999) 3 DIGITS FIXED |
| | | NUMBER OF SENT PAGES | TPG=XXX | M | NUMERAL STRING (0~999) 3 DIGITS FIXED |
| | | NUMBER OF RECEIVED PAGES | RPG=XXX | M | NUMERAL STRING '000' ONLY |

FIG. 9B

COMMUNICATION CONTROL UNIT

This application is a continuation of application Ser. No. 07/759,954 filed Sep. 17, 1991, now abandoned, which is a continuation of application Ser. No. 07/550,223 filed Jul. 9, 1990, now abandoned, which is a continuation of application Ser. No. 07/137,341 filed Dec. 23, 1987, now abandoned.

BACKGROUND OF THE INVENTION

Field of the Invention

The present invention relates to a communication control unit.

Related Background Art

Heretofore, data from a host such as a personal computer or word processor has been communicated through a telephone line. In this case, a communication control unit is provided between the host and the telephone line to send data to the telephone line and to receive data therefrom.

A data transmission rate of such a communication control unit is determined in accordance with a function of a communicating station and a status of the telephone line. In this case, a data transmission rate between the host and the communication control unit, and a data transmission rate between the communicating station and the communication control unit must be considered.

When the host is to transmit data to destination stations of different types, the host is required to effect different communication processing, which is complex.

In the prior art system, the transmission rate between the host and the communication control unit and the transmission rate between the communicating station and the communication control unit are set to be equal. Since the transmission rate between the communicating station and the communication control unit varies with the status of the telephone line, it is necessary to change the transmission rate between the host and the communication control unit if the former transmission rate is changed during the transmission. As a result, the control of the communication control unit is complex.

SUMMARY OF THE INVENTION

It is an object of the present invention to solve the problems described above.

It is another object of the present invention to provide an improved communication control unit.

It is another object of the present invention to set a data transmission rate between a host and a communication control unit higher than a data transmission rate between the communication control unit and a communicating station.

It is another object of the present invention to allow the communication control unit to set a data transmission rate with the communicating station in accordance with the data transmission rate between the host and the communication control unit.

It is another object of the present invention to set the data transmission rate with the communicating station in accordance with the data transmission rate between the host and the communication control unit which effects different communication protocols for the host and the communicating station.

It is another object of the present invention to adjust a data transmission rate in the data transmission between the host and a facsimile machine.

It is another object of the present invention to simplify communication protocol between the host and the communication control unit of the communication control unit having at least two different communication protocols.

It is another object of the present invention to simplify communication control in the host.

Other objects of the present invention will be apparent from the following description of the embodiments.

DETAILED DESCRIPTION OF THE PREFERRED EMBODIMENTS

One embodiment of the present invention is now explained with reference to the drawings.

An outline of the embodiment is first explained. A communication control unit of the present embodiment has a T.30 protocol of the G3 facsimile protocol of the CCITT Recommendation and the RS hand shake protocol (JUST-PC protocol) for communicating with a personal host such as a personal computer or word processor.

The communication control unit of the present embodiment detects a rate of image data transferred from the host in a facsimile mode and sets a modem speed in the T.30 protocol (DCS) lower than a transfer speed of the host to reduce an image error.

It is effective when code data in the host is communicated by the facsimile protocol. In this case, the code data is format-converted to image bit data and is sent to the facsimile machine. If a communicating station is a personal computer, a communication protocol for personal computer communication or word processor communication (JUST-PC protocol) is selected from a ROM to effect the communication. In this case, data format is not converted, but code data is sent.

Figure 1:
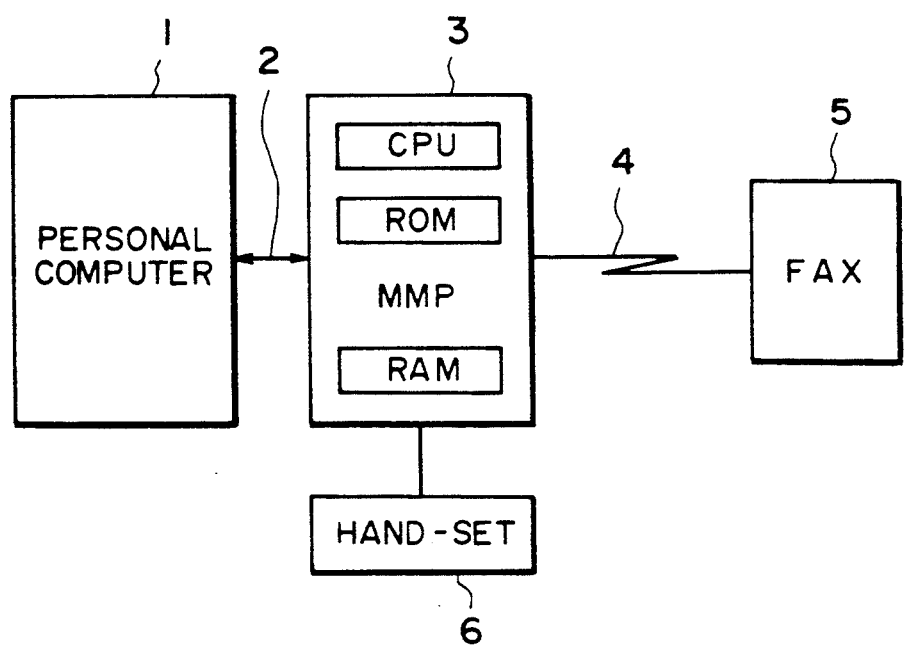
FIG. 1 shows a block diagram of a system configuration of an embodiment of the present invention.

FIG. 1 shows a conceptual view of the present system. Numeral 1 denotes a host which is connected with a communication function unit 3 through a cable 2. The host 1 transfers a control instruction and image data to the communication function unit 3 to transmit an image to a destination facsimile machine through a public telephone line 4. The image data from the host 1 is compressed by the MH (modified Hoffmann) system. The communication function unit 3 includes protocol to support the T.30 protocol, a modem and an NCU and has a function of G3 facsimile transmission. The communication function unit 3 is provided with a speech unit (not shown). A handset 6 is connected to the communication function unit 3. When the host 1 is not connected to the communication function unit 3, the CPU of the communication function unit 3 detects the non-connection of the host 1 and switches the relay of the NCU to the speech unit so that it operates as a telephone set.

The CPU of the communication function unit 3 switches the relay of the NCU to the speech unit in accordance with an instruction of a switch (not shown) to allow speech by the handset 6. As in the non-connection status of the host 1, the communication function unit 3 operates as the telephone set.

Figure 2:
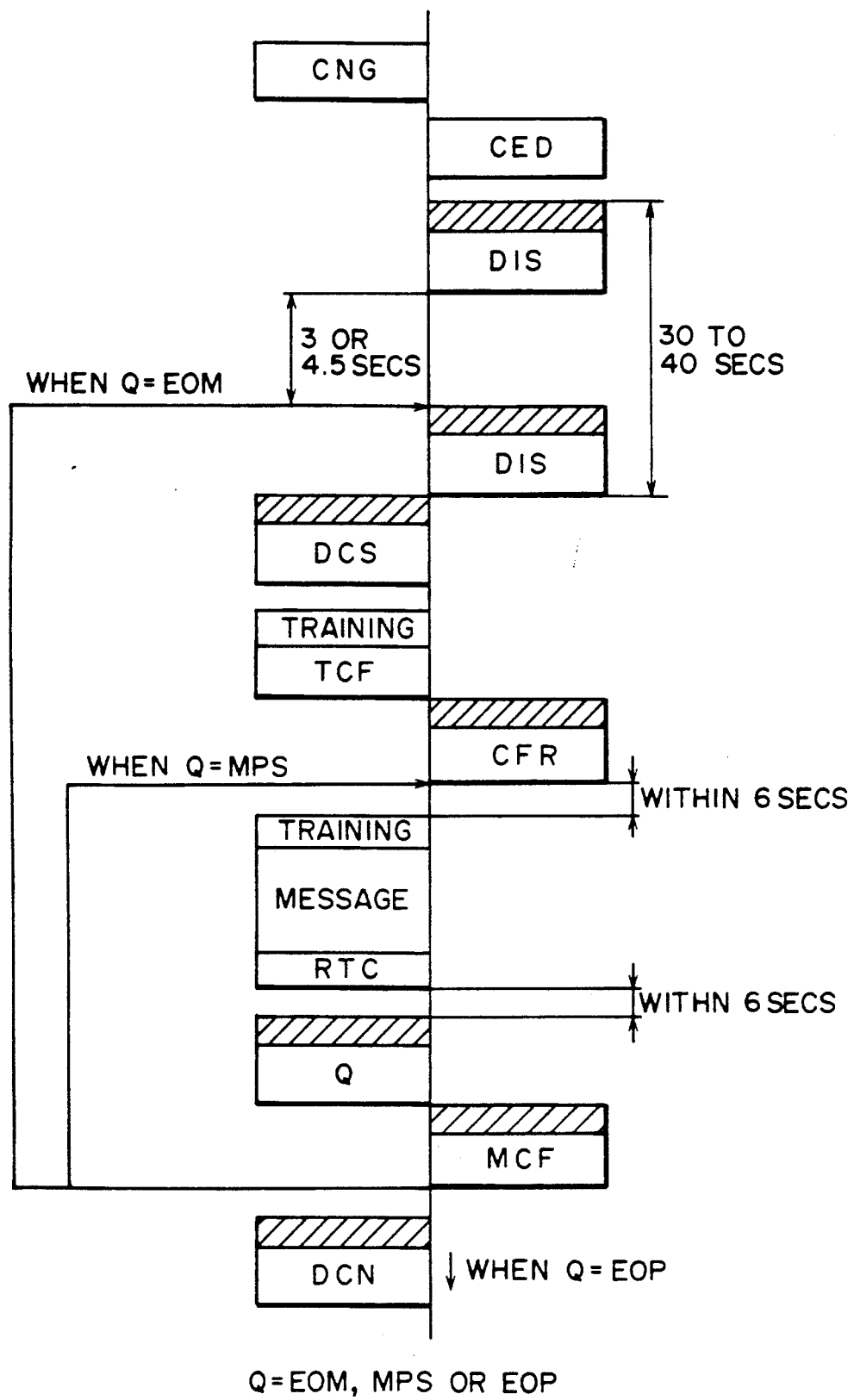
FIG. 2 shows a sequence of facsimile communication.

Referring to FIG. 2, a normal sequence of automatic calling and called operations by G3 facsimile binary protocol is explained. The left side shows the calling station and the right side shows the called station. The calling station calls the called station by a dial signal, and when the called station is connected, the calling station sends a calling tone CNG. The called station responds thereto by sending a tonal signal of the called equipment identification CED.

Then, the called station sends a digital identification signal DI in binary form representing a communication condition. Until the calling station sends a digital command signal DCS in response to the DIS signal, the called station repeatedly resends the DIS signal for 30-40 seconds.

The calling station sends the DCS signal in accordance with the content of the DIS signal, sets a communication rate and a specification, sends training signal and checks data, and whether or not the called station can correctly receive data.

If the called station correctly receives data, it sends back "confirmation of ready to receive" CFR in binary form. If it cannot receive them, it sends back failure to train FTT in binary form, and restarts from the DCS signal with a reduced transmission rate as required. If the calling station does not send an image signal within six seconds after it has received CFR, it is interpreted as an error and the line is disconnected. Thus, the communication function unit must have received the image data from the host by that time. According to the CCITT Recommendation T.4, the G3 facsimile machine uses an MH or MR (modified READ) compression method to compress the image signal. Normally, the MH compression is carried out and an end of line EOL code is added to each line. A minimum transmission time of one line of image is determined by DIS and DCS to be one of 0, 5, 10, 20 and 40 milliseconds. Similarly, a maximum transmission time of one line is defined as 5 seconds. Accordingly, when the data transmission rate of the host is low, a fill (continuous "O"s) is inserted between the data and the EOL. However, since it is rare that the data is delayed in the prior art system, an error takes place in a commercially available facsimile machine if a long fill is inserted such that previous data is inserted by a line error or drive of a paper feed motor is stopped and the image is rendered discontinuous. Accordingly, it is not possible to reduce the transmission rate by inserting too much fill.

At the end of the image data, $\theta$ represents end of message EOM, multi-page signal MPS and end of protocol EOP, in binary form. For EOP, the called station sends message confirmation MCF and the calling station sends disconnect command DCN to disconnect the line.

If further image data is to be sent under the same condition, MPS is sent and the next page of data is sent within six seconds after the reception of MCF. EOM is used when further image data is to be sent under another condition. In this case, the process returns to the initial DIS signal.

Figure 3:
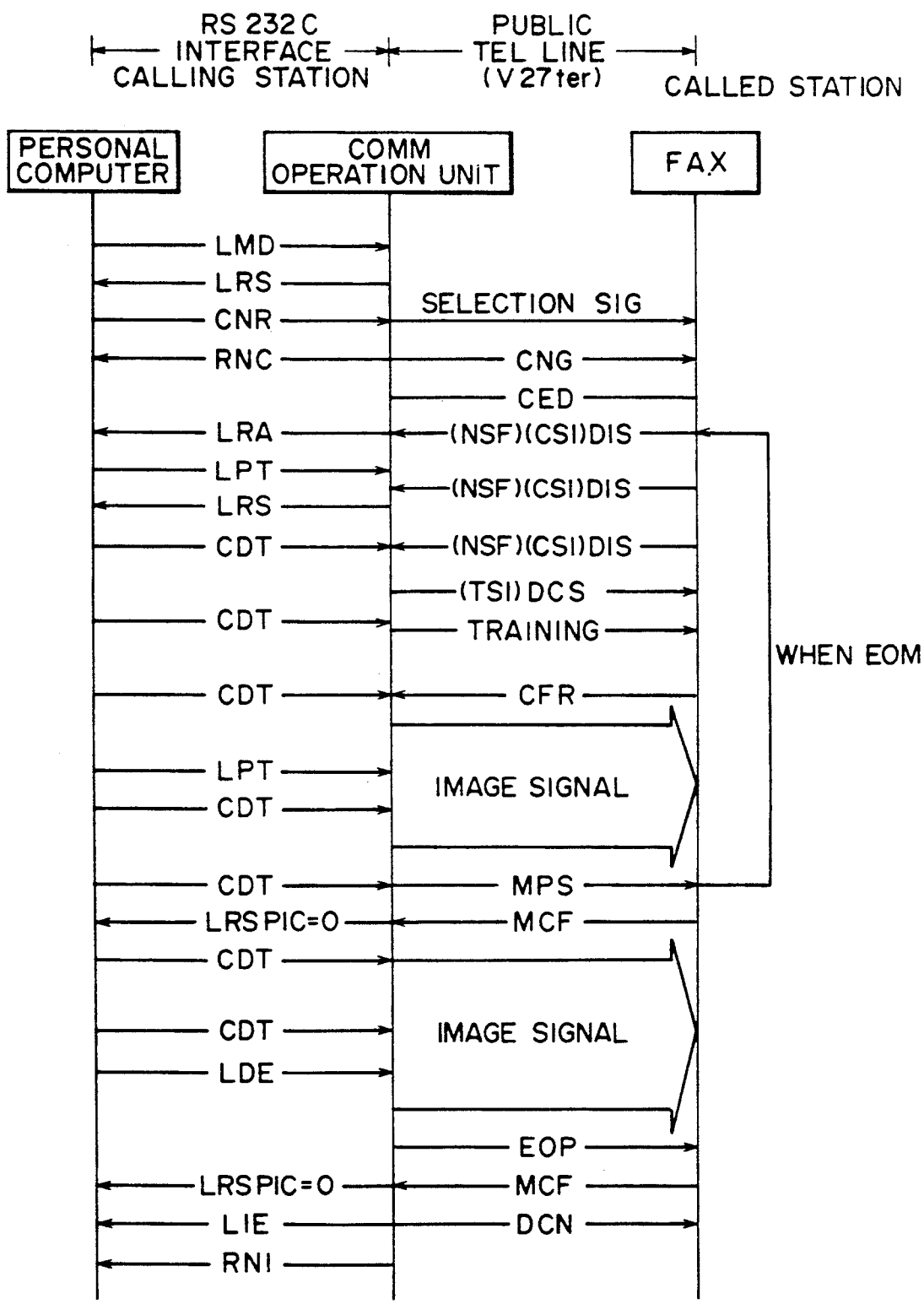
FIG. 3 shows a sequence of communication control in the embodiment.

FIG. 3 shows a sequence of the system of the present embodiment. The personal computer and the communication function unit have the RS232C interfaces and use asynchronous serial signals. Commands and transmission control conform to the personal computer communication apparatus recommended communication system (JUST-PC) announced by The Japanese Ministry of Postal Services in 1984. All commands except those starting with L (excluding LRS), are the same as those of JUST-PC. First, the communication function unit is initialized by an operation mode set command LMD which contains a telephone number of its own station and a user ID and it responds by a local response LRS. Then, the telephone number is put into the parameter unit by a calling command CNR and telephone number data of a called station.

When a facsimile machine of the called station is connected, the communication function unit sends a recognition of connection signal RNC to the host and sends a calling tone CNG to the facsimile machine of the called station. When the communication function unit receives DIS following CED from the facsimile machine of the called station, it receives the content of DIS at the host as a communication signal of called terminal identification signal LRA. The host sends information for DCS in accordance with DIS by a page transmit request command LPT which includes encoding system, record width, record length, maximum transmission rate, resolution and page retransmission. The transmission rate may be selected in accordance with a modem performance, but if it is not lower than a data transmission rate between the host and the communication function unit, an image error or underline may be created. Accordingly, the host-communication function unit speed information is detected and DIS is set to be lower than that. If the system cannot detect such information, a transmission rate of the response LRS to LMD may be detected. LPT also requests the confirmation of the page previously sent. For the first LPT, the response LRS, without a parameter, is sent back. Thereafter, the host sends the image data to the parameter unit by a send data command CDT. When more than a predetermined amount of data has been stored in a buffer of the communication function unit, the communication function unit checks the reception of the command LPT which gives a command to send the next page and carries out the sequence starting from DCS to prevent the under-run and the insertion of the fill due to shortage of data from the host. When the image data has been sent, the host sends data following the command LPT. The communication function unit checks the data amount of the next page in the buffer after it has sent the image signal and if it is smaller than the predetermined amount, it issues EOM, and if a sufficient amount of data has been stored, it continuously sends the image signal by MPS. The host informs the communication function unit of the last page by a document end command LDE following the image data. In the parameters of LRS for the command LPT for the second or subsequent page, PIC=0 means MCF and PIC=1 means failure to receive RTN. When PIC=1, if there is a retransmission capability declaration in LPT, the image data following LPT may be transmitted by interrupting the transmission of the next page. For RTN, the process starts from DIS so that the delay of data of the host is prevented. The buffer preferably has approximately 2k bytes.

Figure 4:
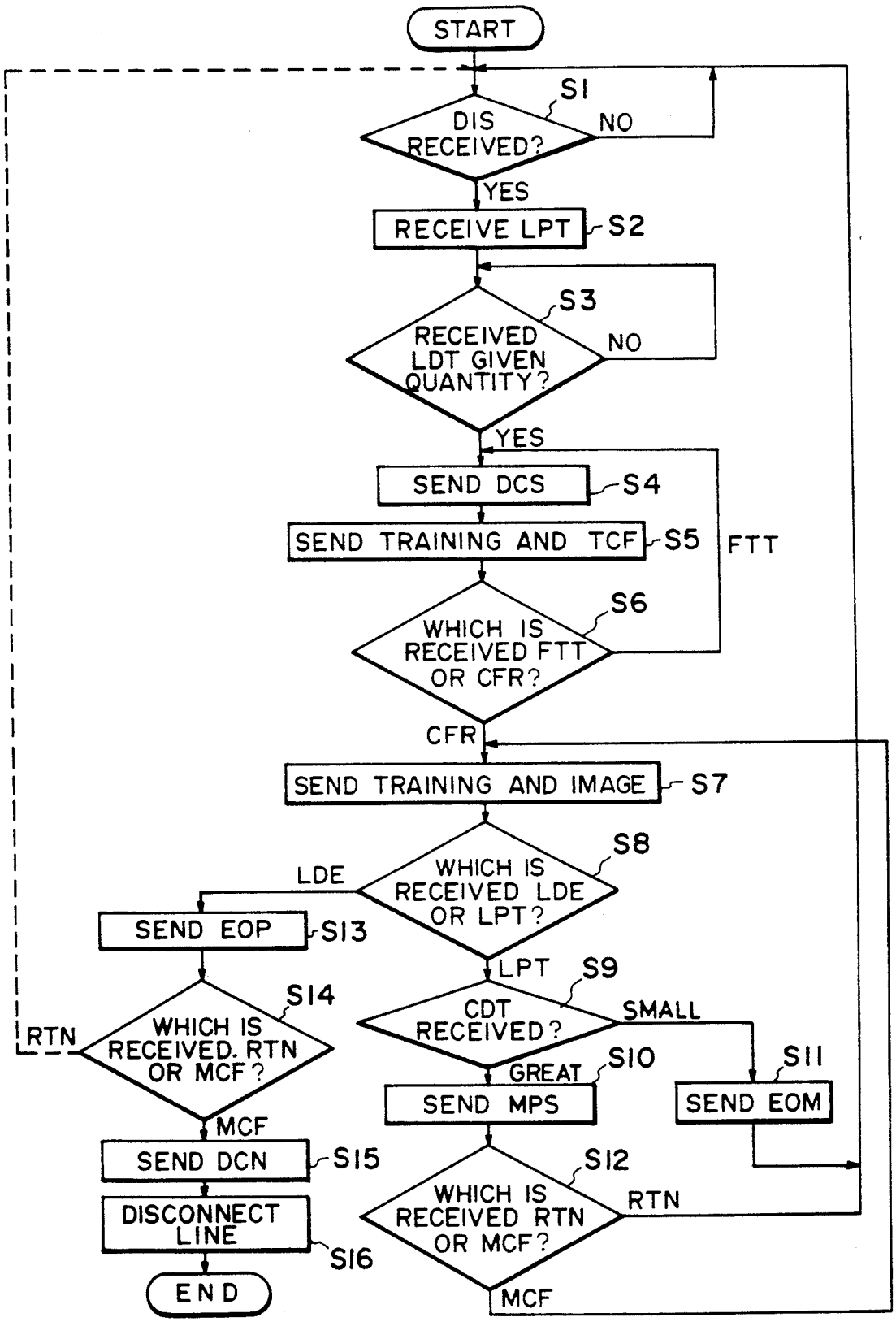
FIG. 4 shows a flow chart of a sequence of a communication function of the embodiment.

FIG. 4 shows a flow chart of the control operation of the CPU of the communication control unit.

When a facsimile mode is set by reception of LMD from the host, LRS is sent to the host. The data transmission rate between the host and the communication control unit is set at this time. The data transmission rate with the host may be 9600 bps, 7200 bps, 4800 bps or 2400 bps. When the communication control unit receives CNR from the host, it carries out a calling operation through the telephone line in accordance with CNR. After the calling, it checks in a step S1 if it has received the DIS signal from the facsimile machine of the called station. If it receives the DIS signal, it sends LRA to the host. In this manner, the function information of the facsimile machine of the called station is sent to the host.

In a step S2, when the communication control unit receives LPT for setting the communication mode from the host, it sets the communication mode in accordance with LPT, and receives the transmission data CDT from the host and stores it in the buffer memory.

In a step S3, if it determines that the amount of received transmission data CDT stored in the buffer is more than the predetermined amount, it sends, in a step S4, DCS to the facsimile machine of the called station in accordance with the communication mode designated by LPT, and sends a training signal and a training check signal TCF in a step S5. In a step S6, it receives a facsimile protocol signal from the facsimile machine of the called station, and when it receives confirmation of a ready to receive signal CFR from the called station, it proceeds to a step S7. If it receives a failure to train signal FTT, it returns to the step S4 where a fall-back operation is carried out so that the transmission rate is reduced and the training is retried. The communication control unit of the present embodiment has 9600 bps, 7200 bps, 4800 bps and 2400 bps as T.30 protocol. When the transmission rate with the host is 9600 bps, the setting of the transmission rate by DCS is started from 9600 bps, and if 9600 bps is not operable because of a line condition, the transmission rate sequentially falls back to 7200 bps and 4800 bps. When the data transmission rate with the host is 4800 bps, the setting of the transmission rate by DCS is started from 4800 bps, and if 4800 bps is not operable because of a line condition, the transmission rate falls back to 2400 bps. In the present embodiment, the data transmission rate initially set for the host is fixed, and the data transmission rate with the destination station is set to be lower than the transmission rate with the host.

In the next step S7, training data and the transmission image data CDT stored in the buffer are sent. The data CDT from the host is received in parallel. Since the communication control unit sets the data transmission rate with the host higher than the line transmission rate (data transmission rate with the destination station), the amount of the transmission data from the host stored in the buffer sequentially increases. When the buffer of the communication control unit becomes full, the CPU of the communication control unit sends a stop signal for the data transmission to the host. Thus, the host stops the output of the transmission image data CDT to the communication control unit. Since the communication control unit sends the transmission data CDT of the buffer, it sends a request of transmission to the host when the amount of untransmitted data in the buffer is less than a predetermined amount to resume the transmission of the data from the host. In this manner, the CPU of the communication control unit sends the image data from the host. When one page of image data has been sent in the step S7, it is determined in a step S8 whether a protocol signal from the host has been received or not. When LDE has been received, an end of transmission is detected and the process proceeds to a step S13. If LPT has been received, the presence of the next transmission data from the host is detected and the process proceeds to a step S9. In the step S9, the amount of data CDT in the buffer is checked, and if it is more than the predetermined amount, no change of mode is detected, and in a step S10, MPS is sent. When the amount of data in the buffer is less than the predetermined amount, the change of mode is detected and EOM is sent in a step S11, and the process returns to the step S1. When the process proceeds to a step S12 from the step S10, it is checked whether MCF or RTN has been received from the called station, and if MCF has been received, the process proceeds to the step S7, and if RTN has been received, the process returns to the step S1.

On the other hand, when the process proceeds from the step S8 to the step S13, an end of message signal EOM is sent to the facsimile machine of the called station. In a step S14, whether MCF or RTN has been received is checked, as in the step S12. If the reception of RTN is detected in the step S14, the process returns to the step S1, and if the reception of MCF is detected, the process proceeds to a step S15. In the step S15, DCN is sent, and in a step S16, the line is opened and the host is informed of normal termination of communication.

As described above, by setting the line rate to be lower than the transmission rate of the host, under-run of and the overinsertion of fill bits can be prevented and correct image data can be transmitted.

In the above embodiment, the communication between the personal host such as a personal computer and a facsimile machine has been explained. The communication control unit of the present embodiment also controls the communication between the personal computer and the word processor (host). In the present embodiment, communication between the host and the communication control unit is effected by a common communication control for the communication with the facsimile, machine and the communication with another host without providing different communication protocols. As a result, the protocol of the communication control unit is simplified.

Figure 5:
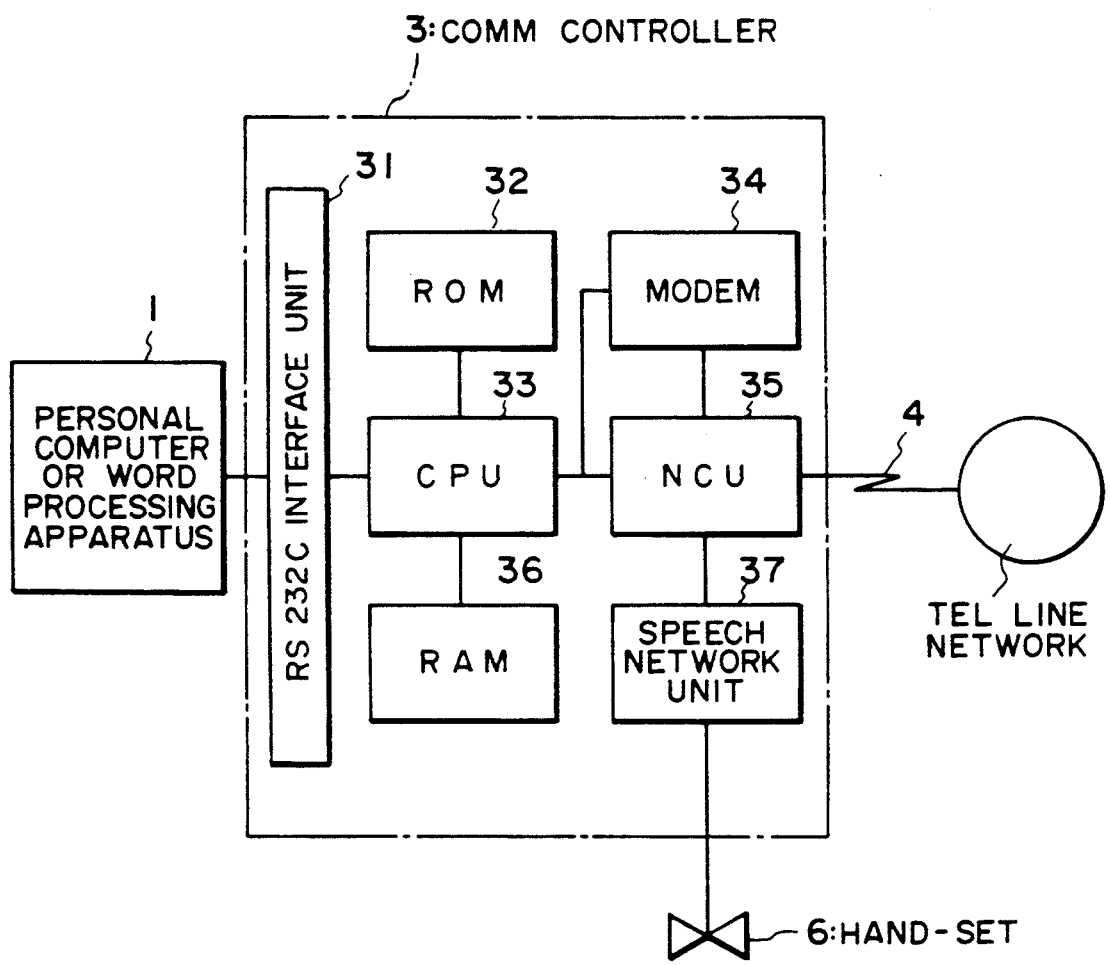
FIG. 5 shows a block diagram of a communication control unit of the embodiment.

FIG. 5 shows a block diagram of a configuration of a telephone set having a communication control function in accordance with the present invention.

In FIG. 5, numeral 3 denotes a communication control unit which controls communication protocol and speech, and which corresponds to the communication function unit of FIG. 1. Numeral 31 denotes RS232C interface unit for connecting an external equipment (for example, a personal computer or word processor) and the communication control unit 3. Numeral 32 denotes a read-only memory (ROM) which stores a control program. The ROM 32 contains a T.30 protocol program, a JUST-PC protocol program, an external equipment protocol program, an encoding/decoding program and a program for controlling the communication control unit 3. The encode/decode system of the present embodiment may be a modified Huffmann (MH) method, modified READ (MR) method or modified modified READ (MMR) method. Numeral 33 denotes a CPU which controls the communication control unit 3. Numeral 34 denotes a modem for modulating and demodulating code data, image signal and protocol signal. Numeral 35 denotes a network control unit NCU for capturing and releasing a line 8, and switching a line 4 between a speech mode and a communication mode. Numeral 37 denotes a speech network unit for controlling speech. Numeral 6 denotes a handset for speech.

In the present embodiment, the external equipment (host) 1 and the CPU 33 handshake and control the communication protocol based on the RS handshake to control the communication of the code data or image data with the called station.

Figure 6:
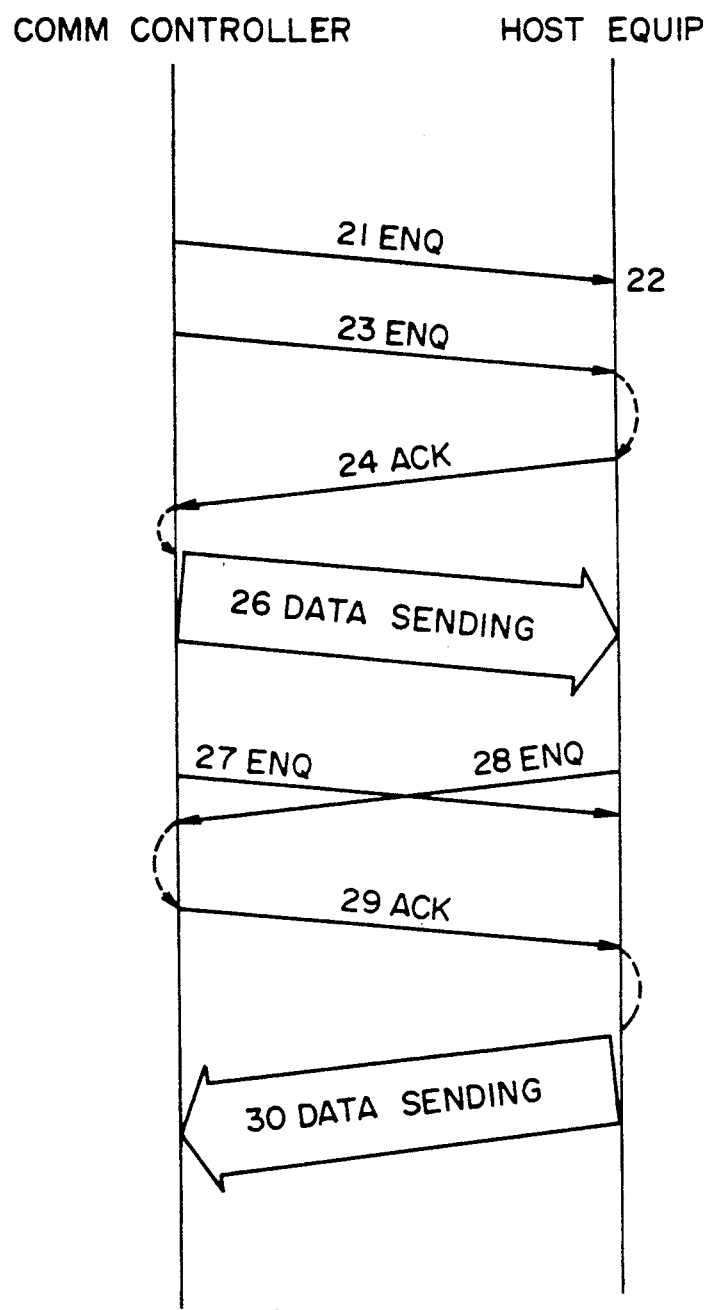
FIG. 6 shows a sequence of RS hand shake.

FIG. 6 shows a sequence of 3-wire handshake protocol in the JUST-PC protocol. In the 3-wire handshake, control codes ENQ (05H) and ACK (06H) are used.

When data arrives at the communication control unit, the communication control unit sends ENQ to the host (21). Since the host is busy and cannot accept the data, it does not send back ACK (22). The communication control unit waits for two seconds for the return of ACK, and when the two-second period elapses, it resends ENQ (23). If the host is ready to receive the second ENQ from the communication control unit, it sends back ACK (24). When the communication control unit receives ACK, it immediately sends data to the host (26). When both the communication control unit and the host send ENQ (27, 28) simultaneously, the host has a priority. After the host has sent ENQ, it receives ENQ from the communication control unit, but the host neglects it and waits for ACK from the communication control unit. The communication control unit receives ENQ from the host and sends ACK (29). The host receives ACK from the communication control unit and sends data (30).

The 3-wire handshake protocol in JUST-PC has thus been described. Data is transmitted and received between the host and the communication control unit by the above protocol in facsimile transmission as well as personal computer communication.

Figure 7:
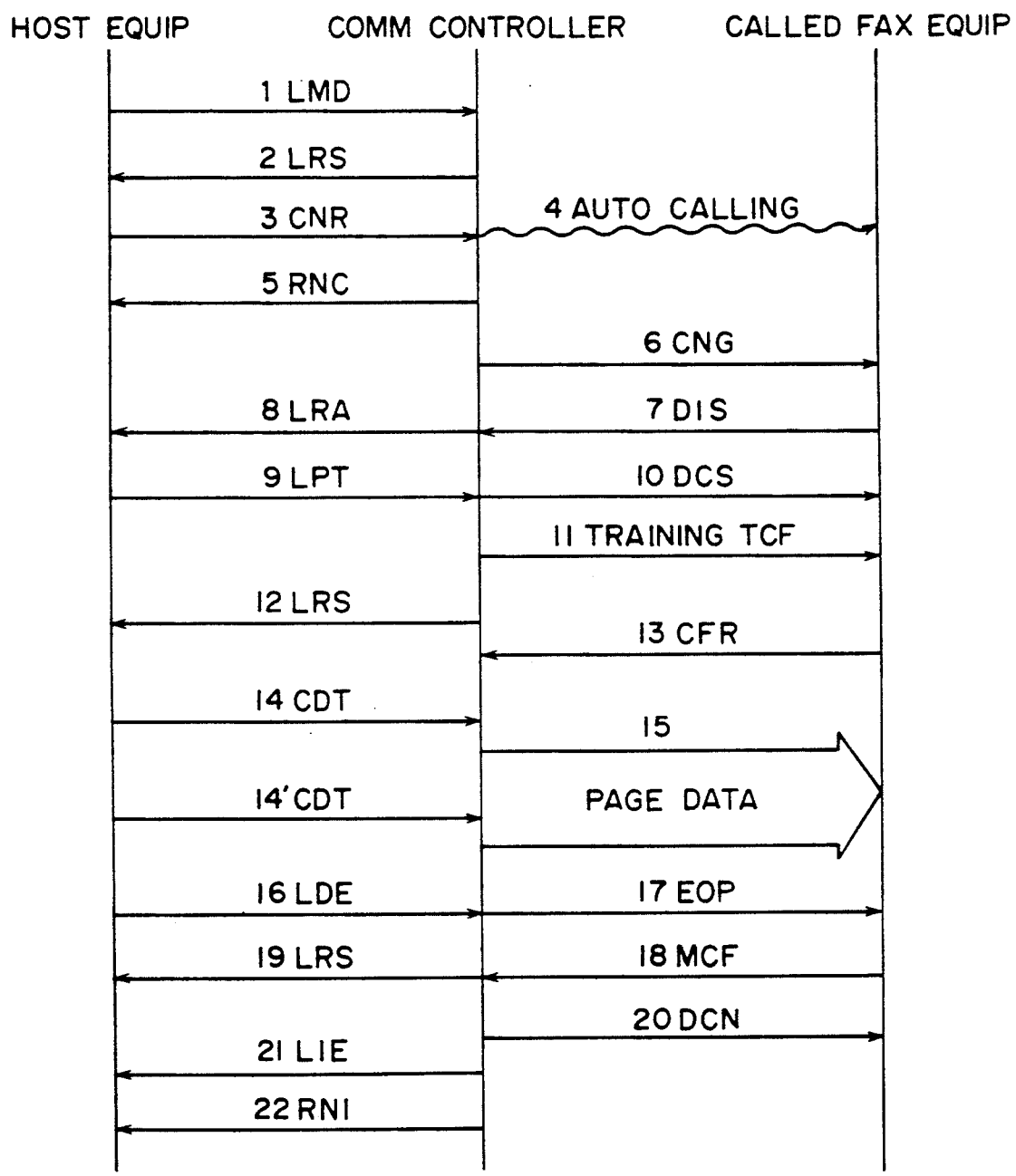
FIG. 7 shows a sequence of facsimile transmission of the embodiment.

FIG. 7 shows a sequence for sending data from the host to the facsimile machine by the communication control unit 1 of the present embodiment. The operation is explained with reference to FIG. 7.

When an operation mode set command LMD is received from the host, a parameter of the LMD command is analyzed. The parameter of the LMD command includes a type of media of the called station (for example, whether the called station is a facsimile machine or a personal computer), a telephone number of the calling station and a user ID indicating a name of the user. If the parameter MOD of the LMD command, which indicates the type of media, is "0", it indicates that the called station is a communication apparatus of the JUST-PC protocol, and if MOD is "1", it indicates that the called station is a facsimile machine of the T.30 protocol. In the present example, MOD is "1" because the called station is a facsimile machine.

When the CPU 33 receives the LMD code, it sends a local response LRS back to the host through the RS232C interface unit 31. In accordance with the analysis of the LMD command, the CPU 33 starts a facsimile mode protocol routine of the T.30 protocol.

When the CPU 33 receives a call command from the host and data CNR of a telephone number of the called station, it captures the line by the NCU 35 and calls through the telephone line network by an auto-dialing unit (not shown) of the NCU 35. When the connection between the called station and the line is detected, the CPU 33 sends the connection confirmation command RNC to the host and sends a calling tone CNG to the facsimile machine of the called station.

When the CPU 33 receives a digital identification signal DIS from the facsimile machine of the called station, it sends a called terminal confirmation signal LRA to the host. The signal LRA comprises seven parameters as shown in FIG. 9 and those parameters are set by analyzing DIS from the facsimile machine. The seven parameters of LRA are a coding method (for example, TYP "0" means that the called station has MH, and TYP "1" means that it has MH and MR), a record width (up to size A4 when HRZ is "0", up to size B4 when HRZ is "1", and up to size A3 when HRZ is "2"), a record length (size A4 when VER is "0", no limit when VER is "1", and sizes A4 and B4 when VER is "2"), a type of modem (V.27 ter fall when MPM is "0", V.27 ter when MDM is "1", and V.2.7 ter and V.29 when MDM is "3"), a resolution (only 3.85 lines/mm when DEN is "0", 7.7 lines/mm may be included when DEN is "1", and 7.7 lines/$mm^2$ may be included when DEN is "2"), a telephone number of the called station (TEL up to 20 digits) and a user ID of the called station. That information is included in DIS and the CPU 33 sets the parameters in accordance with the DIS information.

When the CPU 33 receives a page transmission request LPT from the host, it sends a digital command signal DCS to the facsimile machine in accordance with the parameters of LPT. As shown in FIG. 9, the parameters of LPT are six, that is, a coding method (MH when TYP is "0", and MR when TYP is "1"), a transmission line width (A4 when HRZ is "0", B4 when HRZ is "1", and A3 when HRZ is "2"), a record length (A4 when VER is "0", no limit when VER is "1", and B4 when VER is "2"), a maximum transmission rate (9600 bps when BPS is "0", 7200 bps when BPS is "1", 4800 bps when BPS is "2", and 2400 bps when BPS is "3"), a resolution (3.85 lines/mm when DEN is "0", and 7.7 lines/mm when DEN is "1"), and a page retransmission capability (no when PRC is "0" and yes when PRC is "1"). After the CPU 33 has sent DCS to the facsimile machine of the called station, it sends a training signal and a training check TCF to the facsimile machine and sends a response signal LRS for LPT to the host. The CPU 33 waits until it receives confirmation of a ready to receive signal CFR from the facsimile machine, and when it receives CFR, it waits for reception of the page data CDT from the host. If the line condition to the facsimile machine of the called station is bad and data cannot be transmitted at the transmission rate desired by DCS, the CPU 33 automatically falls back and sends the training signal and TCF to the facsimile machine and sends a stand-by signal to the host for standing by the transmission of the page data. If the host does not receive the stand-by signal from the communication control unit 3, it sends the page data to the communication control unit 3 a predetermined time later. When the CPU 33 of the communication control unit 3 receives the page data from the host, it sends the received page data to the facsimile machine of the called station. When the CPU 33 receives an end of document signal LDE from the host, the facsimile machine of the called station sends an end of protocol signal EOP, and when it receives a message confirmation signal MCF from the facsimile machine, it sends a response signal LRF for LDE to the host. The CPU 33 sends a line disconnect command DCN to the facsimile machine, sends a facsimile end signal LIE to the host, and sends a telephone network disconnection signal RNI.

In the transmission of the page data from the communication control unit 3 to the facsimile machine, the facsimile protocol is carried out between pages. If there is next page data without change of communication mode, the CPU 33 sends a multi-page signal to the facsimile machine and receives MCF from the facsimile machine. If there is next page data with the communication mode changed, the CPU 33 sends an end of message signal EOM to the facsimile machine, and after it has received MCF from the facsimile machine, it again sends DCS, training and TCF and receives CFR.

When the CPU 33 of the communication control unit 3 receives a page retransmission request from the called station, the CPU 33 again transmits the data from the host stored in the RAM 36 to the facsimile machine. The page data received from the host is stored in the RAM 36 by the CPU 33. In the page retransmission, the data to be retransmitted is read from the RAM 36 and retransmitted. In the page retransmission, the CPU 33 sends a message or command indicating the page retransmission to the host. In the present embodiment, the CPU 33 sends the stand-by signal to the host in the fall-back. Alternatively, the page data sent from the host in the fall-back may be stored in the RAM 36 and it may be sent from the RAM 36 after the fall-back has been terminated and the facsimile machine of the called station has become ready.

The sequence of facsimile transmission by the communication control unit 3 has thus been described.

Figure 8:
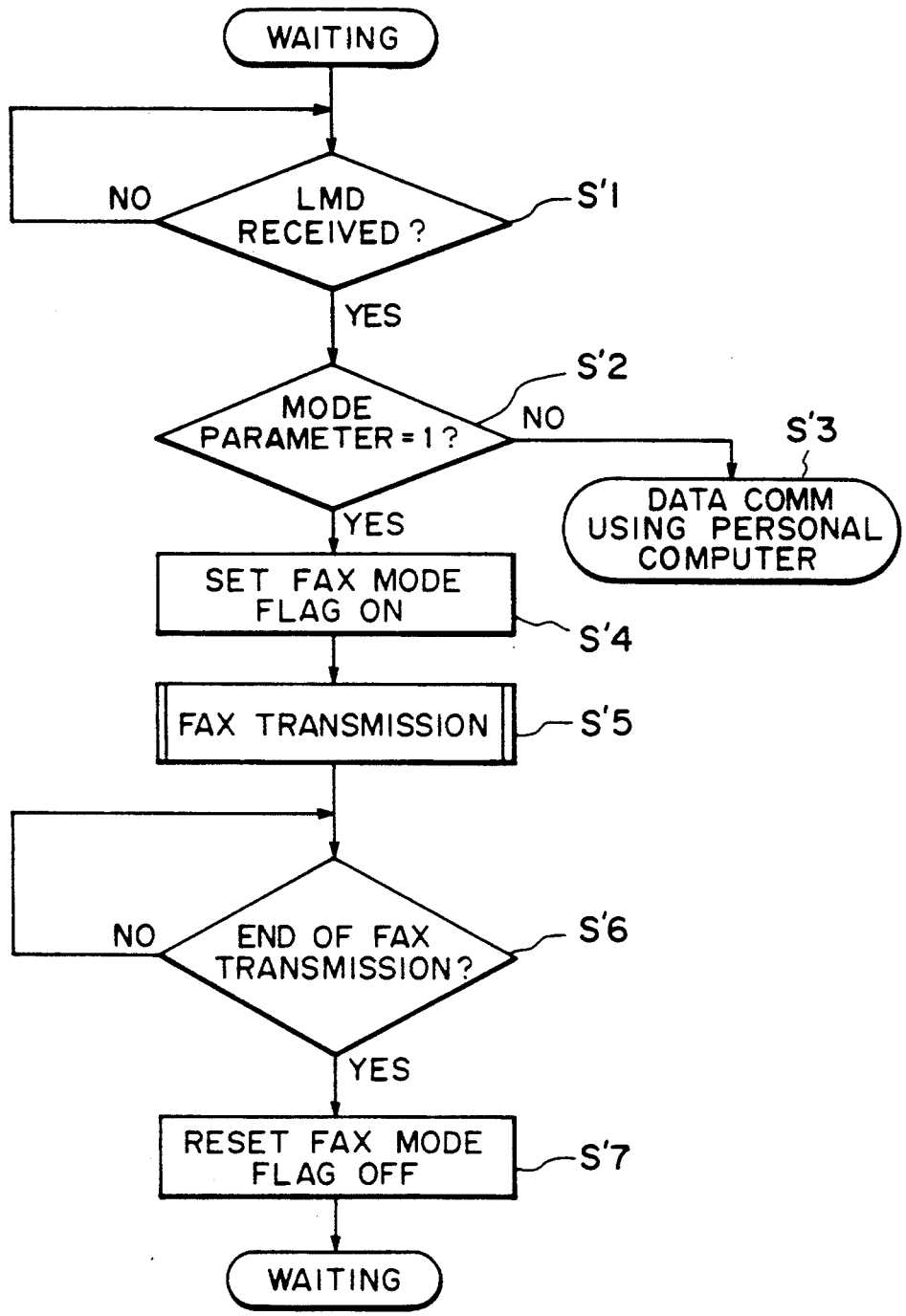
FIG. 8 shows a flow chart of switching between the facsimile protocol and just PC protocol, and FIGS. 9(A-B) show parameters of protocol signals between the host and the communication control unit of the embodiment.

FIG. 8 shows a flow chart of switching of the JUST-PC protocol and the facsimile communication protocol by the LMD command.

In a step S'1 of FIG. 8, the communication control unit waits for the LMD command from the host, and when it receives the LMD command, it analyzes the parameter of LMD in a step S'2, and if it is a facsimile mode, the process proceeds to a step S'4, and if it is a JUST-PC protocol mode, the process proceeds to a step S'3 where the JUST-PC protocol is carried out between the host and the communication control unit 3.

In the step S'4, the facsimile mode flag is set for use as a flag indicating the facsimile transmission. In a step S'5, the facsimile transmission protocol is carried out. In a step S'6, end of facsimile transmission is checked, and if it is ended, the facsimile mode flag is turned off in a step S'7 to set the stand-by mode.

In the stand-by mode, the personal communication mode is set.

The switching sequence from the personal communication mode to the facsimile transmission mode of the communication control unit has thus been described.

The RS handshake protocol between the communication control unit 3 and the personal computer may be common to JUST-PC, and in the facsimile transmission, the personal communication and the facsimile transmission is switched by the LMD command, and in the facsimile transmission, a facsimile transmission command (facsimile transmission expansion local CFU) is used so that the personal computer communication and the facsimile transmission are carried out by one RS handshake protocol. When MOD of the LMD command is "0", a signal from the host is modulated and sent to the line, and a response signal from the called station is demodulated and sent to the host.

In the present embodiment, the communication control unit 3 has the facsimile communication protocol and the JUST-PC protocol. When the communication control unit 3 has a plurality of different communication protocols such as data communication protocol (X.25) for teletex and the facsimile communication protocol or JUST-PC protocol, the parameters of the LMD command may be increased.

As described above, two or more different communication protocols can be carried out by a simple control sequence.

In accordance with the present embodiment, the communication protocol between the host and the communication control unit is common and the process in the host and the control of the communication control unit are simplified.

Since the data transmission rate between the host and the communication control unit is fixed as initially set and the data transmission rate between the communication control unit and the called station is changed in accordance with the line condition and the equipment of the called station, the process in the host is simplified.

In the present embodiment, since the communication control unit converts the communication protocol from the host to the facsimile communication protocol when the called station is a facsimile machine, the process in the host is simplified and the range of the data communication of the host is expanded by the communication control unit.

The present invention is not limited to the above embodiments, but various modifications may be made.

What is claimed is:

1. A communication control apparatus for transmitting data from one terminal equipment to another terminal equipment, comprising:

receive means for receiving data from the one terminal equipment;

transmit means for transmitting the data received from the one terminal equipment to the other terminal equipment;

first setting means for selecting one of a plurality of data reception rates to set the selected one as a first data reception rate for receiving data from the one terminal equipment; and second setting means for setting a second date transmission rate of said transmit means for transmitting the received data to the other terminal equipment in accordance with the first data reception rate, said second data transmission rate being set to a value no greater than the first data reception rate.

2. A communication control apparatus according to claim 1, wherein said transmit means includes modulate means for modulating the received data and transmits the received data modulated by said modulate means to the other terminal equipment.

3. A communication control apparatus according to claim 1, wherein said transmit means includes memory means for storing the data received by said receive means and transmits the data stored in said memory means to the other terminal equipment.

4. A communication control apparatus according to claim 1, wherein said second setting means includes means for changing the second data transmission rate of said transmit means during data transmission by said transmit means, and maintains unchanged the first data reception rate set by said first setting means when the second data transmission rate of said transmit means is changed during data transmission.

5. A communication control apparatus according to claim 1, further comprising means for receiving transmission request data from the one terminal equipment, wherein said transmit means transmits the received data in accordance with the transmission request data.

6. A communication control apparatus according to claim 5, wherein said transmit means converts the transmission request data into a form acceptable by the other terminal equipment and sends the converted data in a data communication protocol signal to the other terminal equipment.

7. A communication control apparatus for transmitting data from one terminal equipment to another terminal equipment, comprising:
 receive means for receiving data from the one terminal equipment;
 transmit means for transmitting the data received from the one terminal equipment to the other terminal equipment;
 first communication protocol means for performing a first data communication protocol with the one terminal equipment, said first communication protocol means selecting one of a plurality of data reception rates to set the selected one as a first data reception rate for receiving data from the one terminal equipment, on the basis of the first data communication protocol;
 second communication protocol means for performing a second data communication protocol with the other terminal equipment, said second date communication protocol means setting a second data transmission rate of the transmit means for transmitting the received data to the other terminal equipment; and
 control means for controlling the setting of said second data transmission rate in said second communication protocol in response to said first data reception rate set in said first communication protocol such that said second data transmission rate is no greater than said first data reception rate.

8. A communication control apparatus according to claim 7, wherein said control means sets the second data transmission rate of said transmit means to be lower than the first date reception rate between said receive means and the other terminal equipment.

9. A communication control apparatus according to claim 7 or 8, wherein said second communication protocol means converts a first data communication protocol signal received from the one terminal equipment by said first communication protocol means into a protocol signal acceptable by the other terminal equipment and sends the converted protocol signal to the other terminal equipment.

10. A communication control apparatus according to claim 9, wherein a data communication protocol sent by said first communication protocol means to any other terminal equipment remains constant.

11. A communication control apparatus according to claim 7, wherein said transmit means includes memory means for storing the data received by said receive means, and transmits the data stored in said memory means to the other terminal equipment.

12. A communication control according to claim 7, wherein said control means includes change means for changing the second data transmission rate of said transmit means during data transmission by said transmit means, and maintains unchanged the first data reception rate between said receive means and the other terminal equipment when said change means changes the second data transmission rate of said transmit means.

13. A communication control apparatus for transmitting data from one terminal equipment to a plurality of different types of terminal equipment, said apparatus comprising:
 receive means for receiving data from the one terminal equipment;
 first transmission means for transmitting data received by said receive means to a first type of terminal equipment in accordance with a first communication protocol, the first type of terminal equipment being a terminal equipment for processing facsimile data;
 second transmission means for transmitting data received by said receive means to a second type of terminal equipment in accordance with a second communication protocol, the second type of terminal equipment being a terminal equipment for processing code data; and
 select means for selecting one of said first transmission means and said second transmission means in response to a command signal from the one terminal equipment.

14. A communication control apparatus for transmitting data from one terminal equipment to a plurality of different types of terminal equipment, said apparatus comprising:
 first transmit means for transmitting data from one terminal equipment to a plurality of different types of terminal equipment to a first type of terminal equipment for processing facsimile data in accordance with a first communication protocol;
 second transmit means for transmitting data from the one terminal equipment to a second type of terminal equipment for processing code data in accordance with a second communication protocol;
 select means for selecting one of said first transmit means and said second transmit means, said select means selecting said first transmit means or said second transmit means in response to a command from the one terminal equipment; and
 receive means for receiving data from the one terminal equipment irrespective of the selection by said select means, said receive means receiving said data on the basis of a common communication protocol.

15. An apparatus according to claim 14, further comprising receive means for receiving data from the one terminal equipment irrespective of the selection by said select means, said receive means receiving said data on the basis of a common communication protocol.

16. An apparatus according to claim 14, wherein said first type of communication equipment is a facsimile machine and said second type of terminal equipment is a data communication terminal.

* * * * *

UNITED STATES PATENT AND TRADEMARK OFFICE
CERTIFICATE OF CORRECTION

PATENT NO. : 5,289,582

DATED : February 22, 1994

INVENTOR(S) : OSAMU HIRATA, ET AL.

It is certified that error appears in the above-indentified patent and that said Letters Patent is hereby corrected as shown below:

IN THE DRAWINGS

Sheet 10 of 10, FIG. 9B, "RECEUED" should read --RECEIVED--.

COLUMN 2

Line 65, "Hoffmann)" should read --Huffmann)--.

COLUMN 3

Line 25, "signal DI" should read --signal DIS--.
Line 33, "checks data, and" should read --data, and checks--.

COLUMN 8

Line 23, "MPM" should read --MDM--.

COLUMN 12

Line 3, "control" should read --control apparatus--.

UNITED STATES PATENT AND TRADEMARK OFFICE
CERTIFICATE OF CORRECTION

PATENT NO. : 5,289,582
DATED : February 22, 1994
INVENTOR(S) : OSAMU HIRATA, ET AL.

It is certified that error appears in the above-indentified patent and that said Letters Patent is hereby corrected as shown below:

<u>COLUMN 12</u>

Lines 38-39, "a plurality of different types of terminal equipment" should be deleted.

Signed and Sealed this

Thirteenth Day of September, 1994

Attest:

BRUCE LEHMAN

*Attesting Officer*     *Commissioner of Patents and Trademarks*